US010088059B2

(12) United States Patent
Dubiel et al.

(10) Patent No.: US 10,088,059 B2
(45) Date of Patent: Oct. 2, 2018

(54) SPREADER WITH ROTARY SLIDE GATE

(71) Applicant: Chapin Manufacturing, Inc., Batavia, NY (US)

(72) Inventors: David Dubiel, Batavia, NY (US); Edward Horeth, Batavia, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 0 days.

(21) Appl. No.: 15/787,316

(22) Filed: Oct. 18, 2017

(65) Prior Publication Data

US 2018/0106382 A1    Apr. 19, 2018

Related U.S. Application Data

(60) Provisional application No. 62/410,151, filed on Oct. 19, 2016.

(51) Int. Cl.
| | |
|---|---|
| *F16K 3/08* | (2006.01) |
| *B65D 83/06* | (2006.01) |
| *A01M 25/00* | (2006.01) |
| *A01C 15/00* | (2006.01) |
| *A01C 15/06* | (2006.01) |
| *A01C 15/02* | (2006.01) |

(52) U.S. Cl.
CPC .............. *F16K 3/085* (2013.01); *B65D 83/06* (2013.01); *A01C 15/006* (2013.01); *A01C 15/02* (2013.01); *A01C 15/06* (2013.01); *A01M 25/006* (2013.01)

(58) Field of Classification Search
CPC ....... F16K 3/085; B65D 83/06; A01C 15/006; A01C 15/06; A01C 15/02; A01C 17/006; A01C 17/008; A01M 25/006
USPC ................ 239/665, 668, 681, 684, 685, 687
See application file for complete search history.

(56) References Cited

U.S. PATENT DOCUMENTS

| | | | | | |
|---|---|---|---|---|---|
| 2,489,171 | A | * | 11/1949 | Balduf .................. | A01C 17/00 222/486 |
| 4,609,153 | A | * | 9/1986 | van der Lely ....... | A01C 17/008 222/482 |
| 4,785,976 | A | * | 11/1988 | Bennie .................. | A01C 15/16 222/370 |
| 5,145,116 | A | * | 9/1992 | Shaver ................. | A01C 17/006 239/665 |
| 7,063,280 | B1 | * | 6/2006 | Bogart ................. | A01C 17/008 239/505 |
| 2015/0136870 | A1 | * | 5/2015 | Myers ................. | A01C 17/001 239/7 |
| 2016/0106028 | A1 | * | 4/2016 | Kendall .............. | A01C 17/008 239/1 |

* cited by examiner

*Primary Examiner* — Christopher Kim
(74) *Attorney, Agent, or Firm* — Woods Oviatt Gilman LLP; Katherine H. McGuire, Esq.

(57) ABSTRACT

A dual gate control assembly for a spreader includes a rotary plate pivotable between fully open and fully closed positions with respect to openings formed in the hopper. A spreader gate is provided at the outermost openings of the hopper and rotary plate with each spreader gate being independently movable between fully opened and fully closed positions allowing for a plurality of variable operational modes affecting both material drop amount and spread direction.

2 Claims, 13 Drawing Sheets

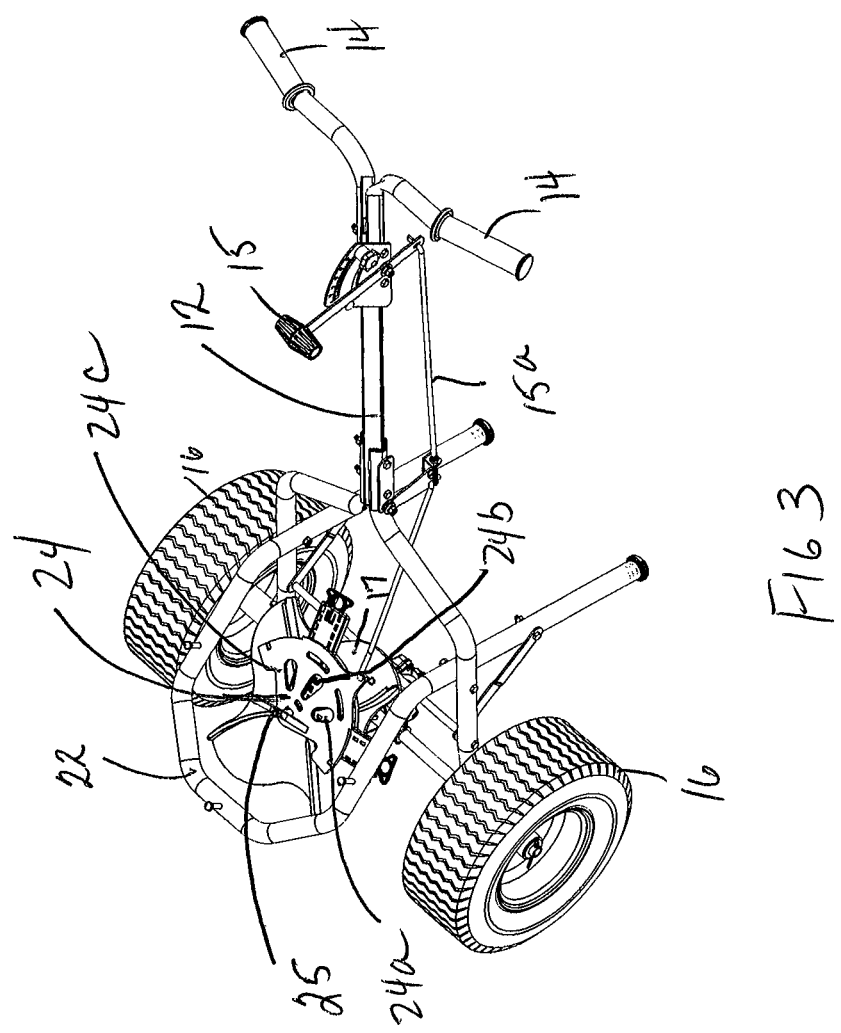

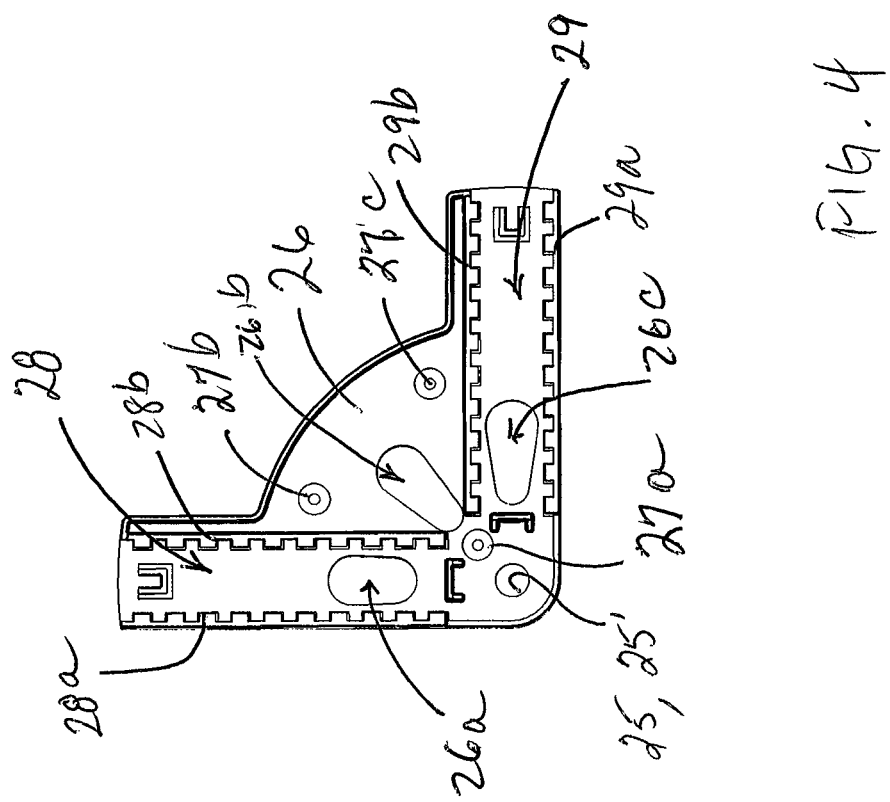

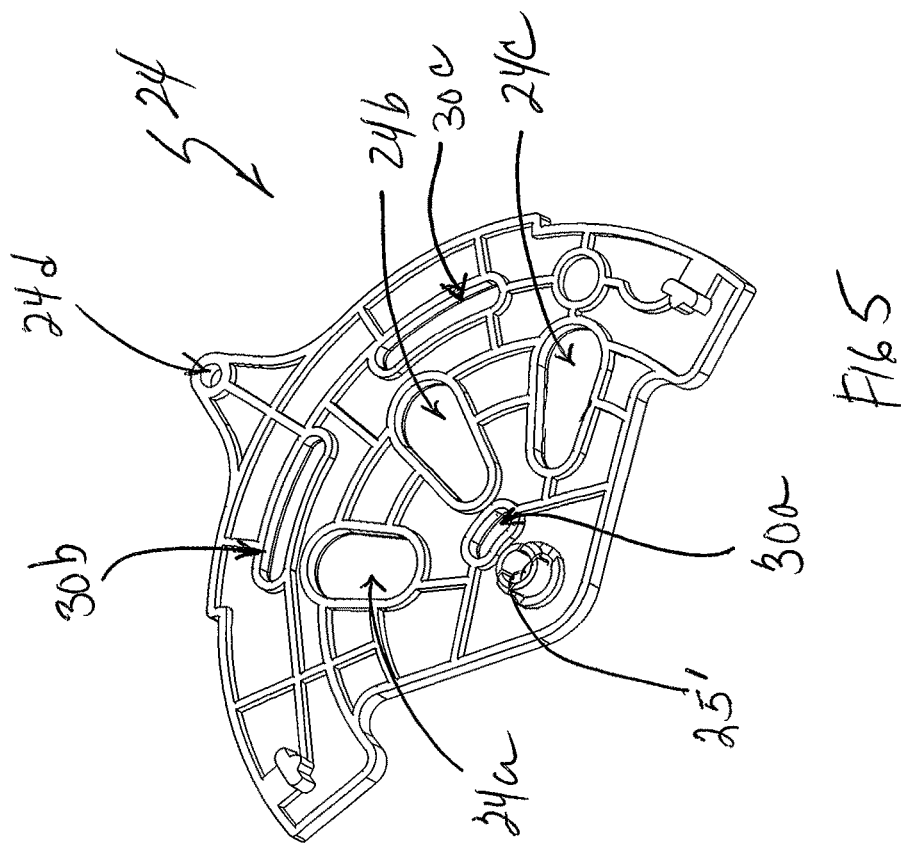

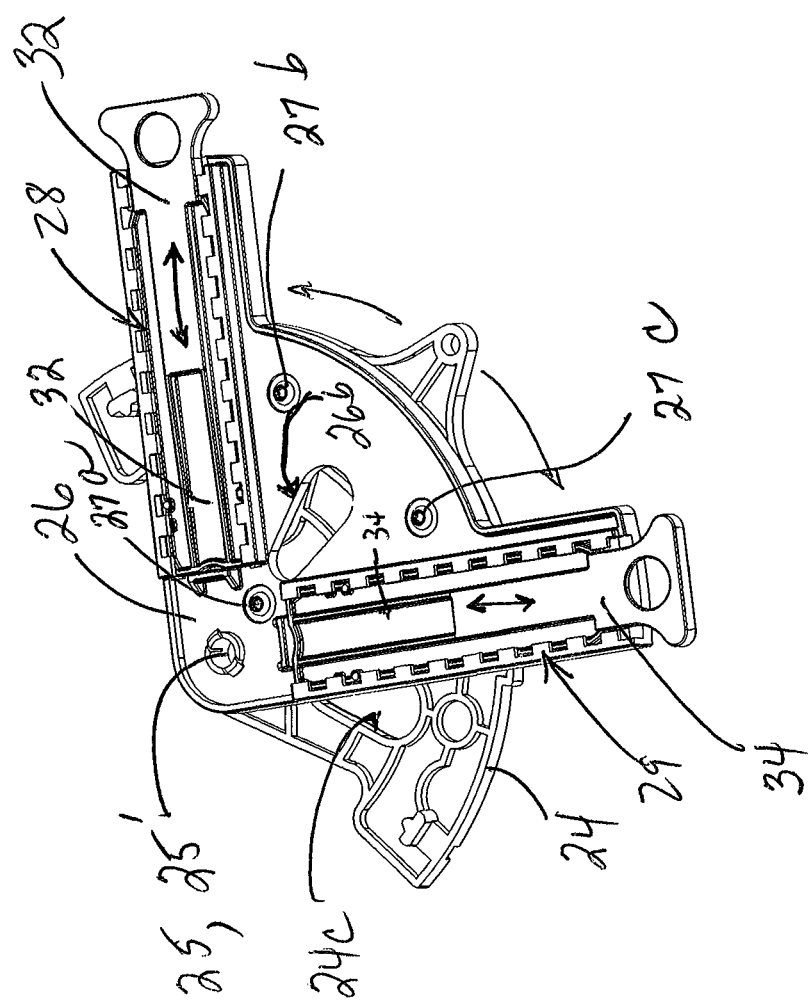

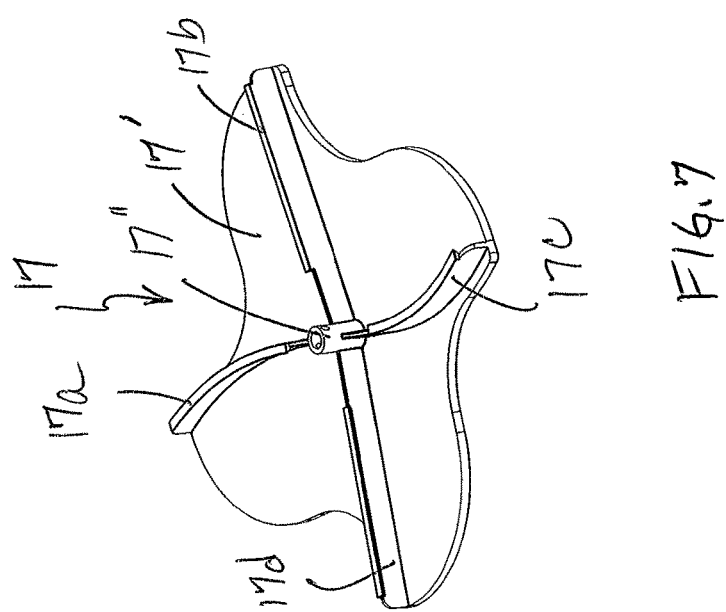

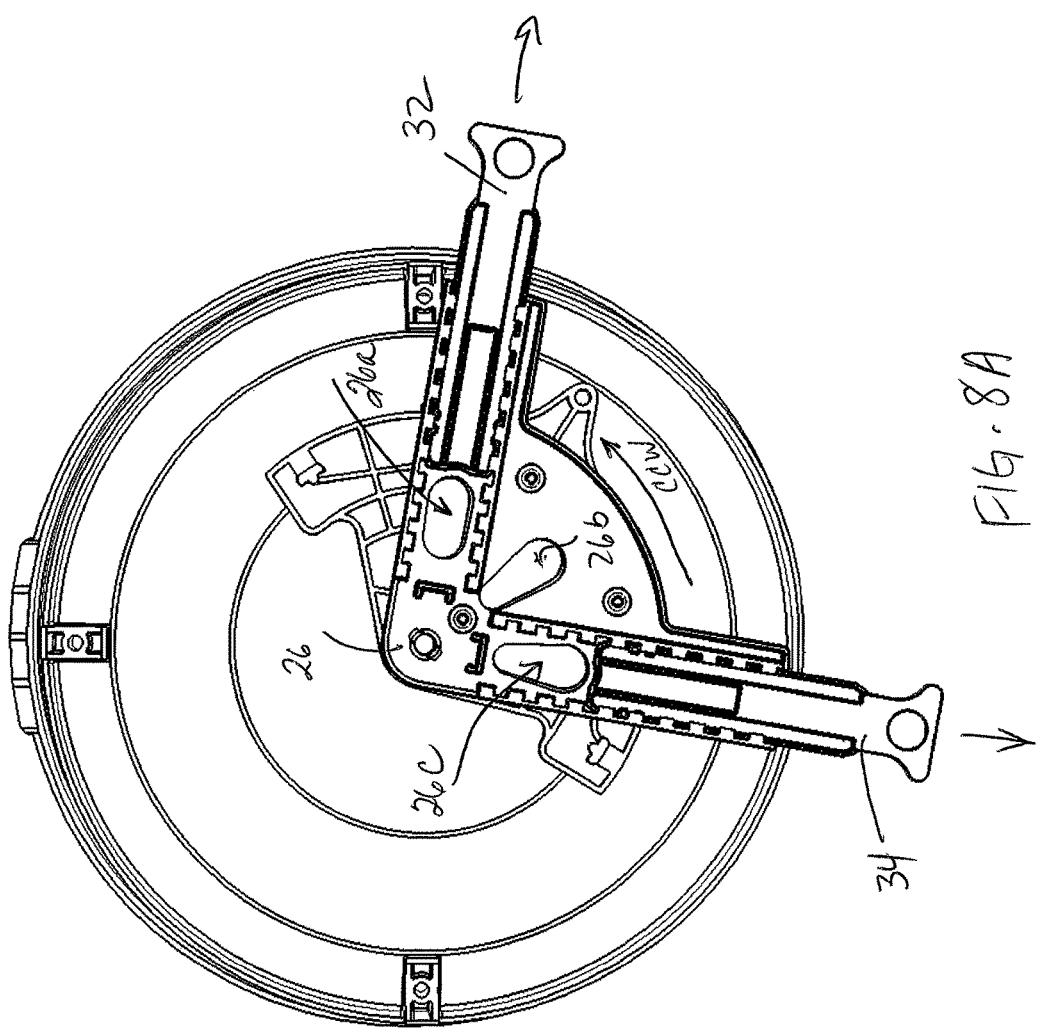

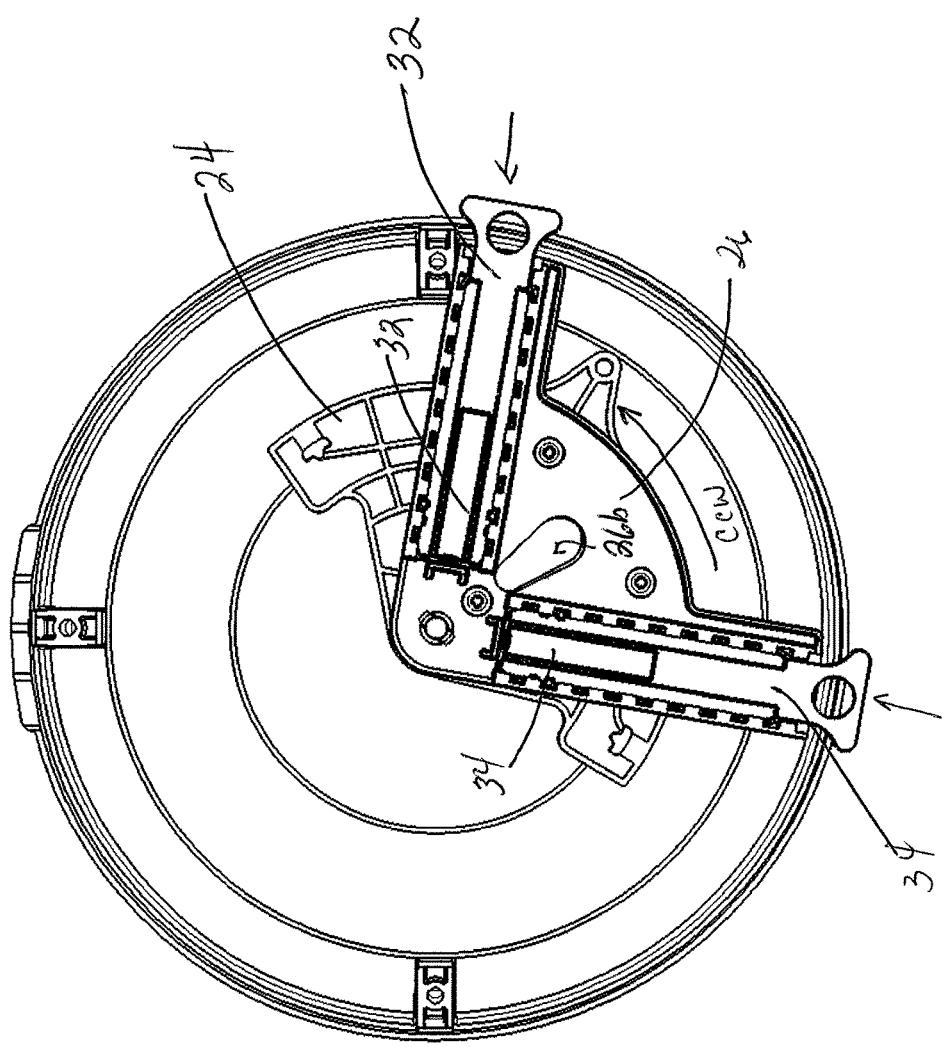

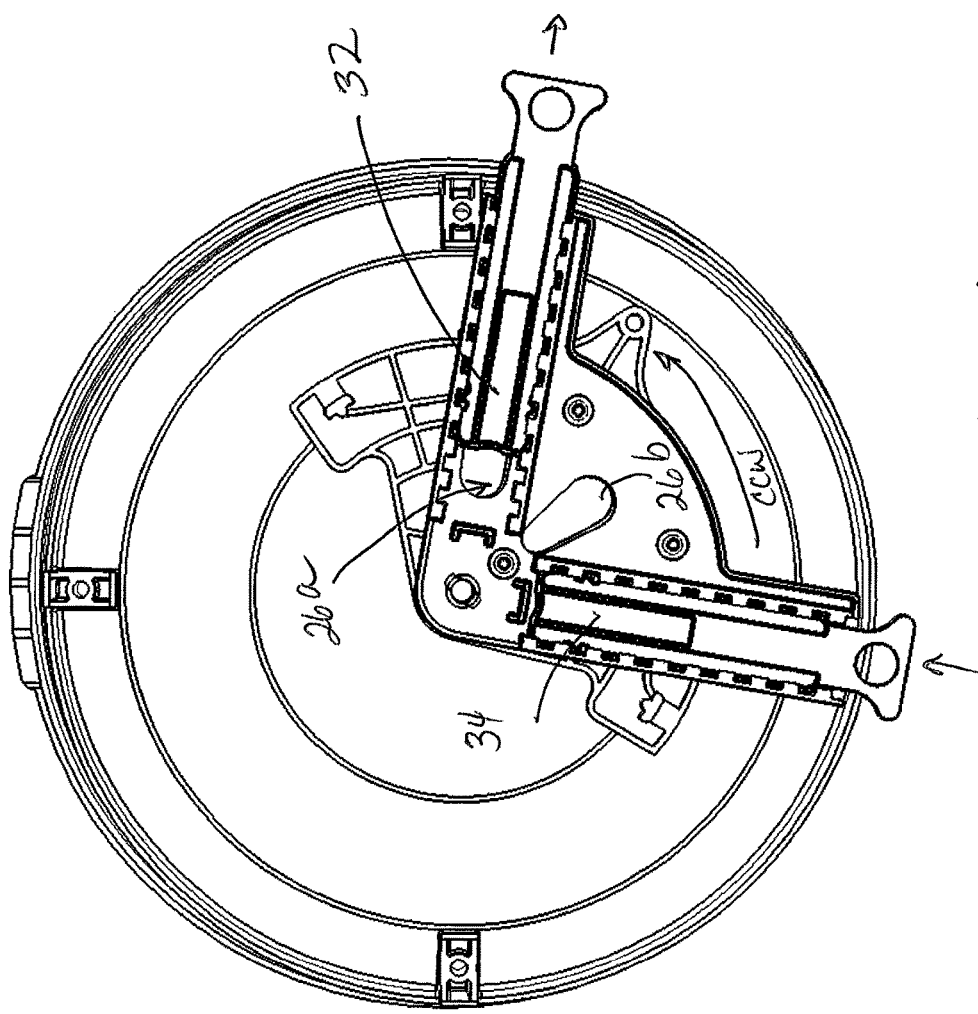

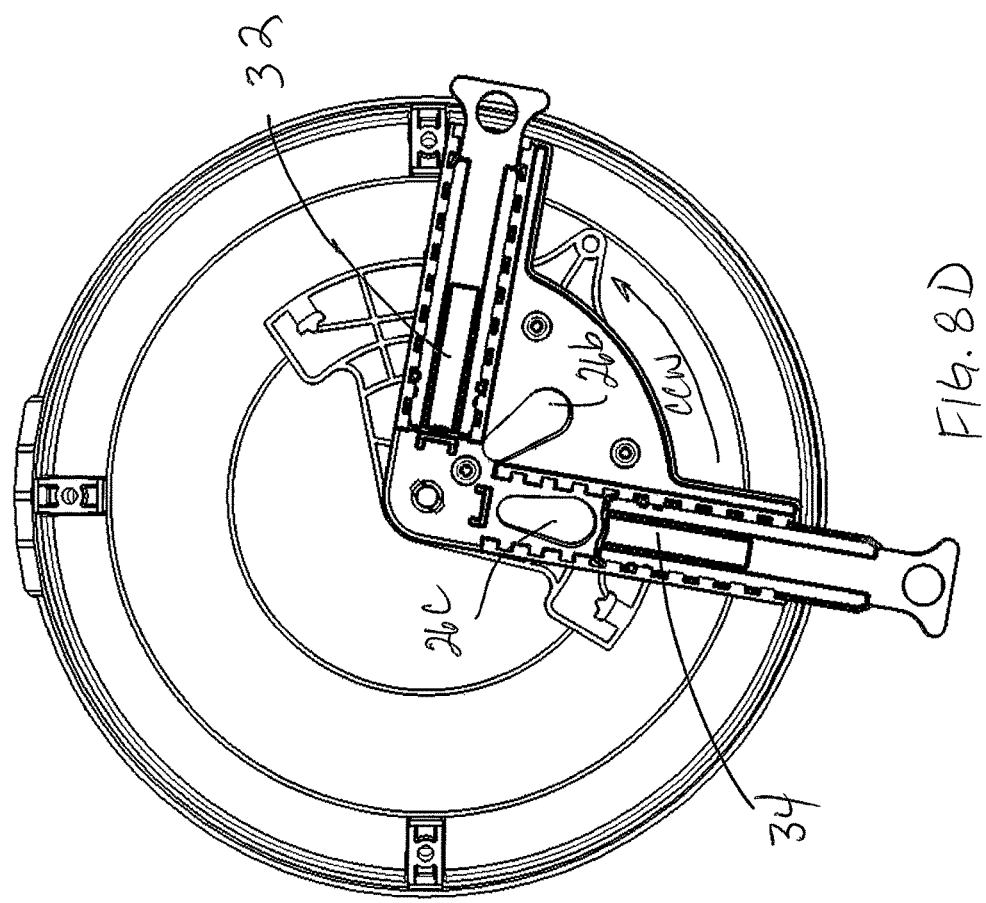

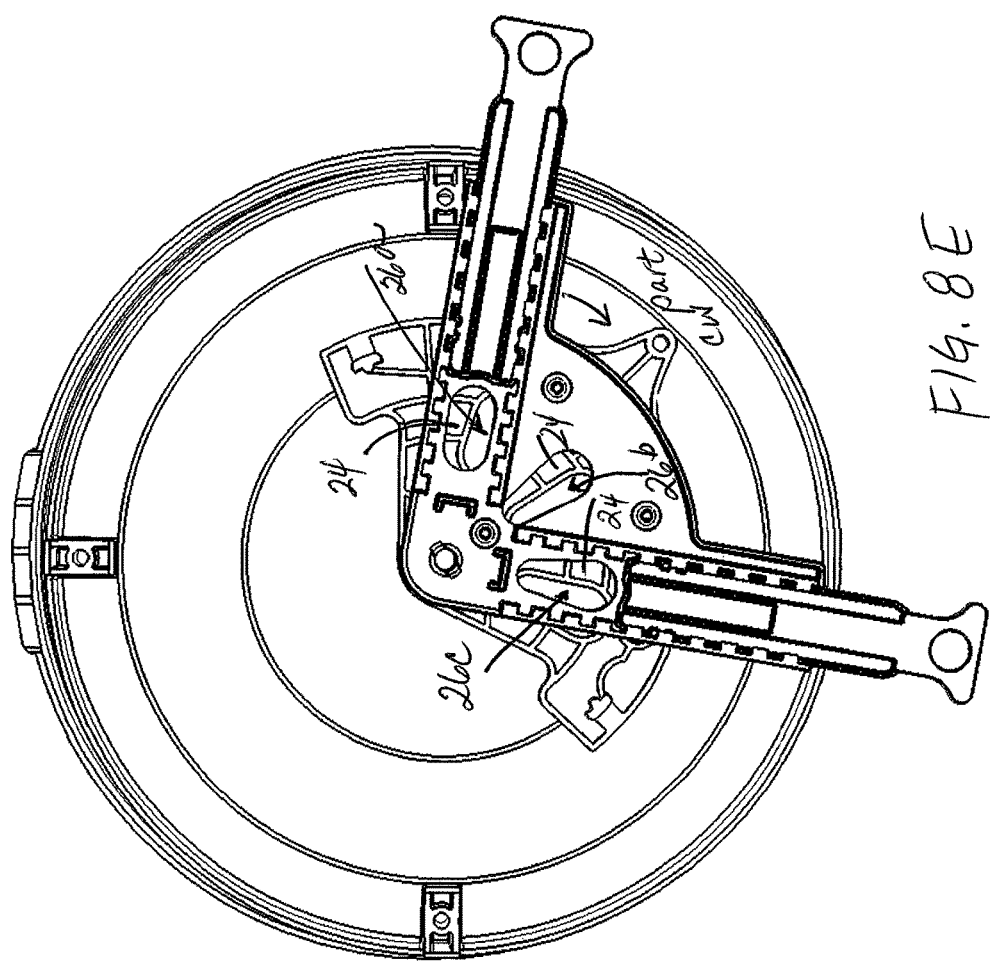

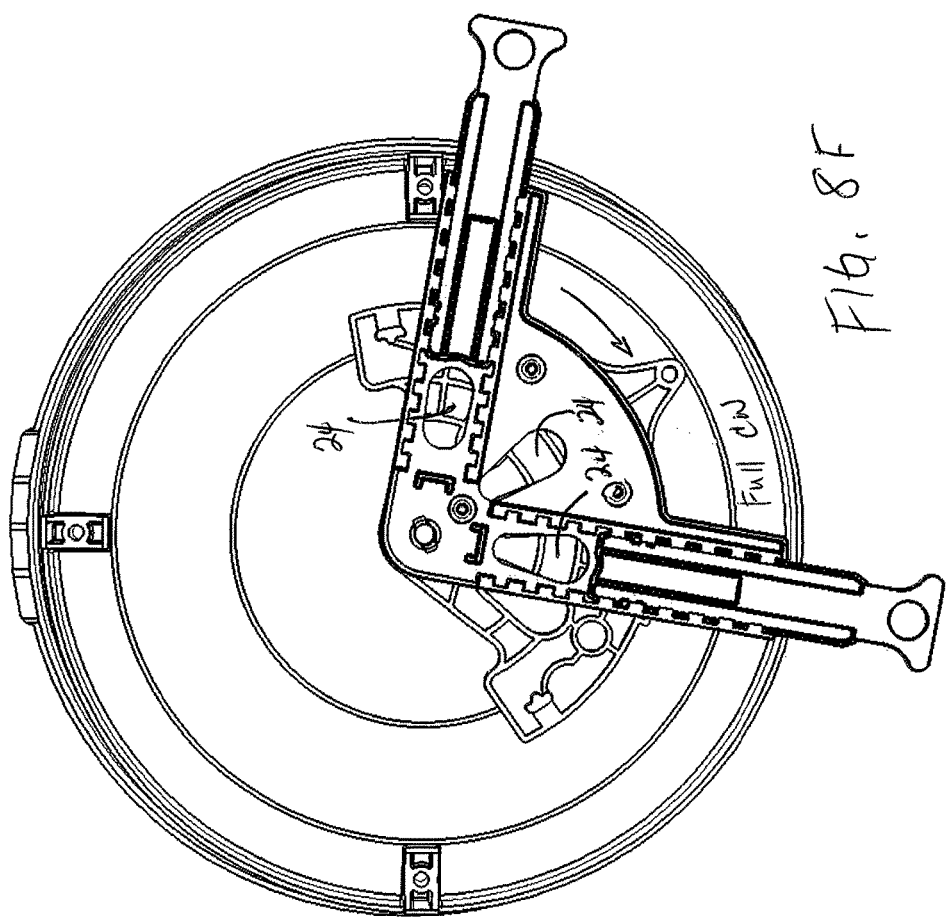

US 10,088,059 B2

SPREADER WITH ROTARY SLIDE GATE

BACKGROUND OF THE INVENTION

The present invention relates to spreaders and more particularly to a spreader with an improved rotary spreader gate.

Typical hand operated spreaders used for applying granular fertilizer and pesticides, for example, include a hopper mounted on two wheels including framework for pushing the spreader along the area to be treated (e.g., lawn). The hopper includes openings wherethrough the material falls. So called broadcast spreaders have an impeller wheel or spreader plate which rotates via a linkage to the wheels. As the material falls from the hopper and onto the spreader plate, the rotational movement of the spreader plate causes the material to be projected radially outward and onto the treatment area. Many spreaders include components allowing for adjustability of the spreader plate such that both amount of material and direction of spread (e.g., right versus left of the spreader) may be controlled. While many spreaders having the adjustability features have been proposed, there remains a need for a spreader having additional adjustability to fine tune the amount and direction of material application.

SUMMARY OF THE INVENTION

The present invention addresses the above need by providing in an embodiment a spreader having a hopper with three spaces openings formed in the bottom wall thereof and wherethrough granular material may pass for application to an area to be treated with the material such as a lawn, for example. A rotary plate is pivotally mounted to the exterior of the hopper bottom wall and includes three spaced openings which align with the three openings in the hopper bottom wall. A slide gate adapter is mounted to the rotary spreader plate. The slide gate adapter has three spaced openings which align with the three openings in the hopper and rotary plate. The slide gate adapter includes a linear channel at each of the right-most and left-most openings. A slide gate is received in each channel and may slide back and forth therein. The slide gates may be individually moved within their respective channels between fully closed and fully open positions. This allows a bi-directional shut off, which varies the material drop point on the impeller wheel, ultimately affecting the direction of spread pattern of the product material left or right. Both the rotation of the rotary plate and the movement of the slide gates allow for an almost limitless selection in amount of product dropped in relation to spread direction.

BRIEF DESCRIPTION OF THE DRAWING

FIG. 3 is a perspective view of the embodiment of FIG. 1 without the hopper;

FIG. 4 is a plan view of an embodiment of the slide gate adapter;

FIG. 5 is a perspective view of an embodiment of the rotary plate;

FIG. 6 is a perspective view of the slide gate adapter with slide gates mounted to the rotary plate;

FIG. 7 is a perspective view of the impeller seen in FIGS. 1 and 3; and

FIGS. 8A-8F show plan views of the hopper bottom wall with the rotary plate and slide gates in varying operational positions.

DETAILED DESCRIPTION OF A PREFERRED EMBODIMENT

Figure 1:
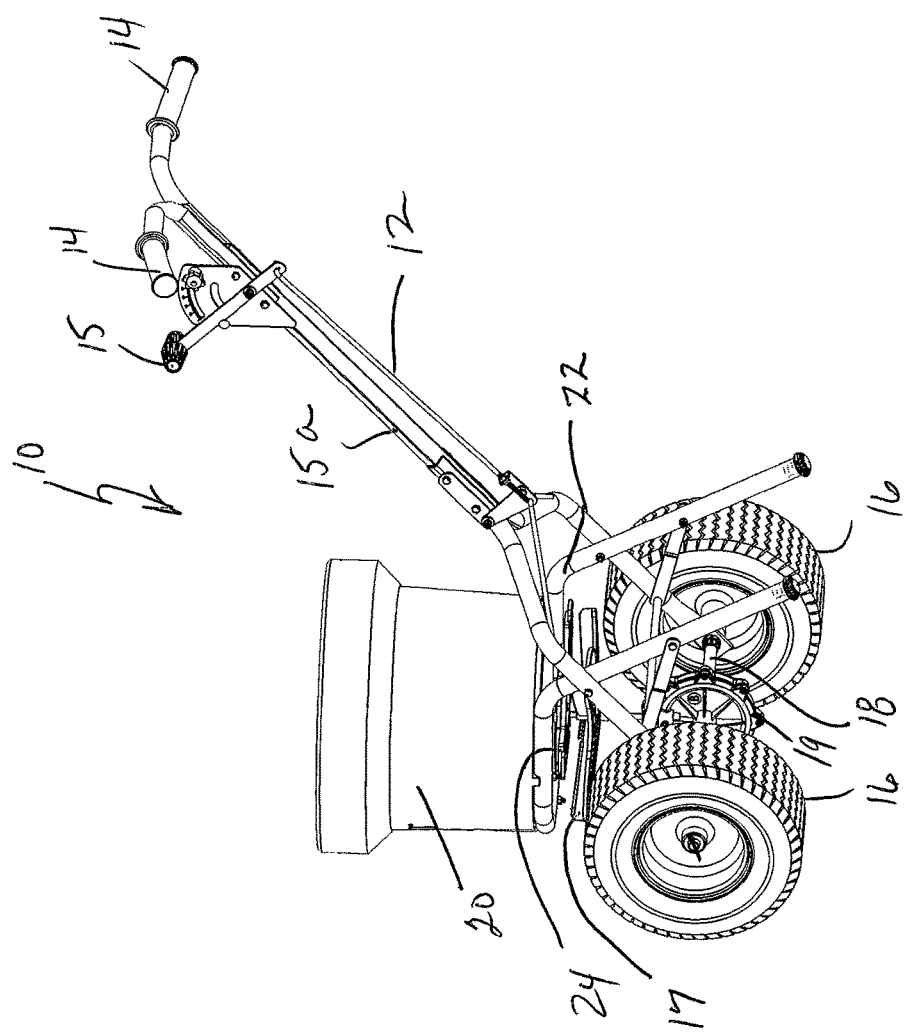
FIG. 1 is a perspective view of an embodiment of the invention comprising a manually operable rotary broadcast spreader.
Figure 2:
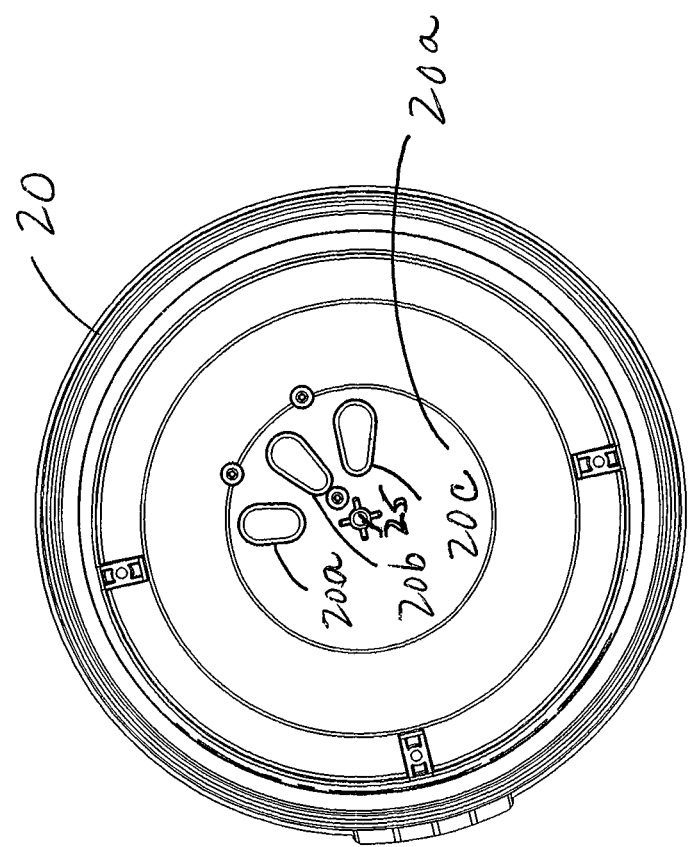
FIG. 2 is a bottom plan view of the hopper seen in FIG. 1.

FIG. 1 illustrates a spreader 10 according to an embodiment of the invention. Spreader 10 includes a frame 12 with handles 14 connecting to two wheels 16 via axles 18. A hopper 20 is mounted upon a U-shaped frame 22 which connects to main frame 12. As seen in FIG. 2, hopper 20 includes a bottom wall 21 having three spaced openings 20a, 20b and 20c wherethrough granular product may fall from the interior of the hopper. An impeller wheel 17 is rotatably mounted beneath hopper 20 and is rotated by movement of the wheels 14 via linkage 19 which connects to impeller at central hole 17" (see FIG. 7). Product which is allowed to fall from hopper 20 through the opening discussed below ultimately falls onto impeller surface 17' which may be divided up into quadrants by vanes 17a, 17b, 17c and 17d in an embodiment. The circumference of the surface 17 and/or vanes may be curved as shown in FIG. 7.

FIG. 3 shows the spreader 10 without hopper 20 so as to reveal the spreader components. A rotary plate 24 is pivotally mounted at pivot point 25 to the exterior of the hopper bottom wall 20a (see also FIG. 2). Rotary plate 24 includes three spaced openings 24a, 24b and 24c (see FIG. 5). Rotary plate 24 may pivot between fully closed and fully open positions such that when moved to the fully closed position, the rotary plate openings 24a, 24b and 24c are completely out of alignment with hopper openings 20a, 20b and 20c and rotary plate 24 acts to close off hopper openings 20a, 20b and 20c thus preventing any material product from falling therethrough. When pivoted to the fully open position, the rotary plate openings 24a, 24b and 24c fully align with the hopper openings 20a, 20b and 20c thus permitting product to fall therethrough. The pivot connection 25, 25' allows the rotary plate 24 to be pivoted anywhere between the fully open and fully closed positions which vary the size of the aligned openings thereby permitting a like variation in the amount of product allowed to fall therethrough. The pivotal movement of rotary plate 24 may be controlled through the use of a lever 15 mounted to frame 12 via linkage 15a which connects to plate 24d (see FIG. 5).

As seen best in FIGS. 4-6, a right angle plate slide gate adapter 26 is mounted to the rotary spreader plate 24 opposite the hopper bottom wall 21. The slide gate adapter 26 is fixed to hopper wall 21 via one or more screws 27a, 27b and 27c which pass through respective elongated slots 30a, 30b and 30c formed in rotary plate 24 which allow rotary plate 24 to freely pivot with respect to hopper 20 and adapter 26 which themselves both remain stationary.

With reference to FIG. 4, slide gate adapter 26 has three spaced openings 26a, 26b and 26c which align with the three hopper openings 20a, 20b and 20c, respectively. Since hopper openings 20a, 20b and 20c are in full and fixed alignment with respect to gate adapter openings 26a, 26b and 26c, the positional relationships of the rotary plate openings 24a, 24b and 24c with respective gate adapter openings 26a, 26b and 26c are the same as with respect to hopper openings 20a, 20b and 20c as discussed above.

The slide gate adapter 26 further includes first and second linear channels 28 and 29 located at the right-most and left-most openings 26a and 26c, respectively. Channels 28 and 29 are configured with spaced parallel side flanges 28a, 28b and 29a, 29b, respectively, in which first and second slide gates 32 and 34 may be slidingly received, respectively. Slide gates 32 and 34 may be selectively moved within their respective channels between fully closed and fully open positions and any intermediate position therebetween. When fully closed, slide gates 32 and 34 completely cover respective openings 26a and 26c. When in the fully open position, slide gates 32 and 34 do not cover any part of respective openings 26a and 26c.

Thus, in a first spreader configuration mode, the rotary plate may be selectively pivoted anywhere between fully open and fully closed positions which, when in the completely open position, do not cover any part of hopper openings 20a, 20b and 20c, and, when in the fully closed position, completely cover hopper openings 20a, 20b and 20c, respectively. Further, in a second spreader configuration mode, the spreader gates 32 and 34 may be individually selectively movable anywhere between fully open and fully closed positions which, when in the fully open position, do not cover any part of gate openings 26a, 26c, and, when in the fully closed position, completely cover gate openings 26a, 28a, respectively. Since the spreader gates 32 and 34 are individually movable, this allows a bi-directional opening and shut off which allows selective variation of the material drop point on the impeller wheel 17, ultimately affecting the direction of spread pattern of the product material left or right. FIGS. 8A-8F illustrates a non-exhaustive number of possible operational positions, as follows:

FIG. 8A—rotary plate 24 pivoted completely counter-clockwise (hopper openings 20a, 20b and 20c and rotary plate openings 24a, 24b and 24c fully aligned) and slide gates 32 and 34 are withdrawn to expose openings 26a and 26c, respectively, which align with hopper openings 20a and 20c as explained above.

FIG. 8B—Same as 8A except slide gates 32 and 34 are pushed inwardly and now cover openings 26a and 26c (and thus also cover hopper openings 20a and 20c and rotary plate openings 24a and 24c). Opening 26b remains open together with aligned hopper opening 20b and rotary plate opening 24b.

FIG. 8C—Same as 8B except slide gate 32 is partly withdrawn to expose part of opening 26a. (and thus also part of aligned hopper opening 20b and rotary plate opening 24b).

FIG. 8D—Same as 8A except slide gate 32 is pushed inwardly and now covers opening 26a (and thus also covers hopper opening 20a and rotary plate opening 24a. Opening 26b remains open together with aligned hopper opening 20b and rotary plate opening 24b.

FIG. 8E—Same as 8A except rotary plate 24 has been pivoted in the clockwise direction between fully open and fully closed positions. Since slide gates 32 and 34 are in their fully open positions, the three aligned openings are now partly closed due to the obstructions caused by rotary plate 24.

FIG. 8F—Same as 8E except rotary plate 24 has been pivoted as far as it will go in the clockwise direction causing all three holes to be covered by rotary plate 24.

It will thus be appreciated that the selective rotation of the rotary plate and the selective and individual movement of the slide gates allow for an almost limitless selection in amount of product dropped in relation to spread direction.

What is claimed is:

1. A spread control assembly configured to control material dispersion from a material spreader, the material spreader including a hopper having a continuous side wall and bottom wall defining a receiving area configured to receive material, the bottom wall including first, second and third, spaced hopper openings through which material may pass, the spread control assembly comprising:

a) a rotary plate pivotally mounted to the bottom wall of the hopper and selectively pivotable to any position between a fully open position and a fully closed position, the rotary plate including first, second and third plate openings configured to align with said first, second and third hopper openings when in any position other than the fully closed position and to align with a non-open portion of the hopper bottom wall when in the closed position; and b) a slide adapter securely mounted to the bottom wall opposite the rotary plate, the slide adapter including a plurality of adapter openings configured to align with the hopper openings and first and second slide gates each selectively slidable to any position between a fully open gate position and a fully closed gate position, wherein each respective slide gate selectively covers a portion of a respective adapter opening when the respective slide gate is in any position other than the fully closed gate position.

2. A material spreader comprising:

a) a hopper mounted onto a frame, the hopper having a continuous sidewall, a bottom wall and an open top end defining a material receiving area, the bottom wall defining a plurality of hopper openings through which material may pass;

b) a rotary plate pivotally mounted to the bottom wall of the hopper and selectively pivotable to any position between a fully open plate position and a fully closed plate position, the rotary plate defining a plurality of plate openings wherein the plate openings are configured to align with at least a portion of the plurality of hopper openings when in any position other than the fully closed position and to align with a non-open portion of the hopper bottom wall when in the closed position; and c) a slide adapter securely mounted to the bottom wall of the hopper opposite the rotary plate, the slide adapter including a plurality of adapter openings configured to align with the hopper openings and first and second slide gates each selectively slidable to any position between a fully open gate position and a fully closed gate position, wherein each respective slide gate selectively covers a portion of a respective adapter opening when the respective slide gate is in any position other than the fully closed gate position.

* * * * *